United States Patent [19]
Gieschen et al.

[11] 3,848,134
[45] Nov. 12, 1974

[54] FILM DISPLACEMENT DEVICE FOR X-RAY APPARATUS

[75] Inventors: Kurt Gieschen; Walter Schmidemann, both of Hamburg, Germany

[73] Assignee: U.S. Philips Corporation, New York, N.Y.

[22] Filed: May 25, 1973

[21] Appl. No.: 363,838

[30] Foreign Application Priority Data
May 31, 1972 Germany.............................. 2226473

[52] U.S. Cl......................... 250/471, 95/37, 355/54
[51] Int. Cl. ............................................. G01n 21/34
[58] Field of Search ................ 250/468, 471; 95/37; 355/53, 54

[56] References Cited
UNITED STATES PATENTS

| | | | |
|---|---|---|---|
| 3,173,011 | 3/1965 | Barrett................................ | 250/471 |
| 3,680,461 | 8/1972 | Amesbury............................. | 95/37 |
| 3,685,897 | 8/1972 | Culligan................................ | 95/37 |
| 3,746,444 | 7/1973 | Kahle.................................... | 355/54 |

*Primary Examiner*—James W. Lawrence
*Assistant Examiner*—D. C. Nelms
*Attorney, Agent, or Firm*—Frank R. Trifari

[57] ABSTRACT

A device for displacing film in an X-ray apparatus, comprising a cassette carriage which carries the film and is movable by means of two motors and cord drive in two mutually perpendicular directions.

7 Claims, 1 Drawing Figure

PATENTED NOV 12 1974      3,848,134
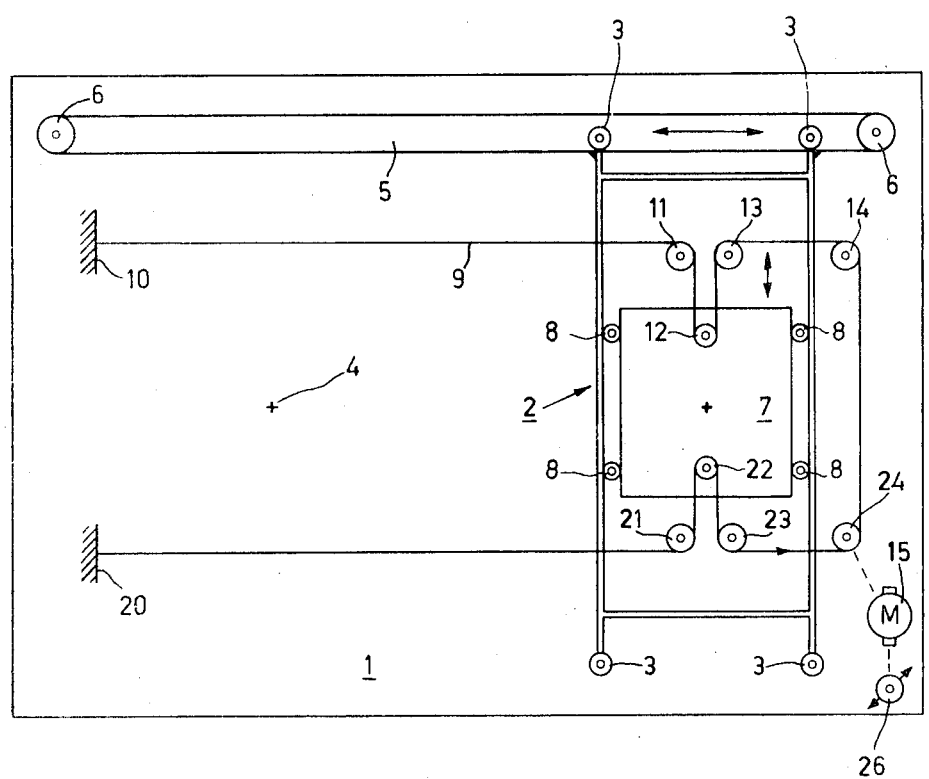

FILM DISPLACEMENT DEVICE FOR X-RAY APPARATUS

BACKGROUND OF THE INVENTION

The invention relates to a film displacement device for X-ray apparatus. A slidable frame which supports a film carriage is displaceable by means of a motor with respect to the frame in a direction perpendicular to the sliding direction of the frame. An X-ray apparatus of this kind is known, for example, from the published German Patent 2,137,752. The advantage of this apparatus is that unobstructed displacement of the film in two mutually perpendicular directions is possible. A drawback, however is, that the electrical supply conductors for the motor for carriage displacement, mounted on the frame in the known apparatus, must be taken along with each sliding movement of the frame. The supply conductors must be arranged such that they obstruct the sliding of the frame as little as possible. In addition, the motor mounted on the frame must also be accelerated for each sliding movement.

The invention has for its object to provide a device which incorporates the advantages of the known device, but which does not have said drawbacks; to this end, the invention has for its object to provide a device of the kind set forth such that the motor for the displacement of the carriage can also be rigidly connected to the apparatus, so that the motor and its supply conductors need not be moved when the frame is displaced.

SUMMARY OF THE INVENTION

According to the invention, the above objects are achieved by using a drive cord for the displacement of the carriage with respect to the frame. The course of the cord is as follows. The cord extends from a fixed point in the sliding direction of the frame to a roller 21 on the frame, in the displacement direction of the carriage with respect to the frame to a roller 22 on the carriage and back to a second roller 23 on the frame, thus forming a first loop. The cord continues further in the sliding direction to a stationary roller 24, then in the direction of the first loop to a second stationary roller 14, back in the sliding direction to two rollers 13–11 on the frame and an intermediate roller 12 on the carriage, thus forming a second loop which is directed opposite to the said first loop, then extends back in the sliding direction to a second fixed point. The displacement is achieved by driving the cord portion between the two stationary rollers.

The displacement of the carriage is effectively controlled by means of a known servo system, the displacement motor displacing a potentiometer wiper until the voltage taken therefrom corresponds to an adjustable voltage. This potentiometer can be coupled to one of the stationary rollers on the apparatus, so that the rotation thereof upon displacement of the carriage is transmitted to the potentiometer wiper.

The invention will be described in detail with reference to an embodiment which is diagrammatically shown in the drawing.

DESCRIPTION OF THE PREFERRED EMBODIMENT

The FIGURE is a plan view of the invention; a frame 2 which is provided with rollers 3 is arranged to be horizontally slidable in the X-ray apparatus 1. The sliding of the frame 2, shown in the stand-by position in the drawing, to the recording position (the recording position is denoted in the drawing by the target 4 of the central beam of the X-ray tube) is effected by means of a toothed belt 5 which is connected to the frame 2 and which passes over the rollers 6, one of which can be driven for the horizontal sliding movement by a motor which is not shown.

A carriage 7, guided by rollers 8, is arranged to be vertically displaceable in the frame 2. Provided for the vertical displacement is a drive cord, preferably a toothed belt 9, which extends from a fixed point 10 (upper left) on the apparatus, via a first roller 11 which is rigidly connected to the frame 2, a roller 12 which is rigidly connected to the carriage 7, a roller 13 which is connected to the frame, thus forming a loop, to a roller 14 which is rigidly connected to the apparatus. The toothed belt 9 further extends as shown via the rollers 24, 23, 22, 21 which are arranged to be symmetrical with respect to the rollers 14, 13, 12, 11, to a fixed point 20 (lower left) on the apparatus.

The carriage 7 is displaceable in and together with the frame 2, within the rectangle denoted by the fixed points 10, 20 and the rollers 14 and 24.

In the case of a horizontal displacment of the frame 2 with the carriage 7, the loops of the toothed belt slide about the rollers 12 and 22 on the carriage 7, without the length of the two loops shown, and hence the vertical position of the carriage 7, being changed.

When the roller 24 is driven by the symbolically denoted motor 15, the length of the loops changes in an opposite sense, without the loops being laterally displaced. Consequently, the carriage 7 is then displaced only in the vertical direction. For example, when the roller 24 is driven counterclockwise, the loop about roller 22 becomes shorter and the loop about roller 12 becomes longer by the same amount, so that the carriage 7 is moved downwards; when the roller 24 is driven clockwise, the carriage 7 is moved upwards in a corresponding manner.

In the case of a sub-division of the film, the centres of the separate sub-formats can thus be displaced each time such that they successively coincide with the central beam 4; for correct control use can be made of a known servo system, comprising for example a potentiometer 26 whose wiper is coupled to the drive shaft of the motor 15, with the result that the voltage on the potentiometer wiper is always a measure for the (central) position of the carriage 7; the potentiometer can alternatively be coupled to one of the rollers 14 or 24.

What is claimed is:

1. In an X-ray apparatus including a base and a carriage for carrying a film, the improvement in combination therewith of means for displacing said carriage comprising a frame which is linearly displaceable on said base in a first direction, said carriage being carried by said frame and being displaceable linearly on said frame in a second direction normal to said first direction, first drive means for moving said carriage in said second direction comprising a system of pulleys and a cord of fixed length extending about said pulleys with ends of the cord fixedly secured on said base at first and second fixed points, said pulleys including a stationary pulley means fixed on said base, first and second carriage pulleys on said carriage, and first and second pairs of frame pulleys on said frame, one pair generally adjacent each of said carriage pulleys, said cord formed as a principal loop extending from said first fixed point to said stationary pulley means and back to said second fixed point, said cord further formed into two secondary loops, each situated along the principal loop intermediate one end of the cord and said stationary pulley means, wherein said cord from said first fixed point extends to one of the pulleys of said first pair of frame pulleys, then to the first carriage pulley, then to the other of said first pair of frame pulleys, then to said stationary pulley means, then to one of the pulleys of said second pair of frame pulleys, then to the second carriage pulley, to the remaining frame pulley, and then to the second fixed point, said drive means further comprising motor means for displacing a portion of said cord extending between said two carriage pulleys for moving the carriage in said second direction.

2. Apparatus according to claim 1 wherein said first direction is horizontal and said second direction is vertical.

3. Apparatus according to claim 1 wherein said stationary pulley means comprises two spaced-apart pulleys on said base defining between them a line in said second direction.

4. Apparatus according to claim 1 wherein said cord is in frictional engagement with said pulleys, said stationary pulley means comprises at least one pulley, and said motor means rotates said stationary pulley for said displacement of the cord engaged thereto.

5. Apparatus according to claim 1 further comprising second drive means for driving said frame in said first direction.

6. Apparatus according to claim 4 further comprising a potentiometer driven by said first drive means to register the amount of rotation of said stationary pulley and the corresponding amount of movement of said carriage.

7. In an X-ray apparatus including a base and a carriage for carrying a film, the improvement in combination therewith of means for displacing said carriage comprising a frame which is displaceable only linearly on said base in a first direction, said carriage being carried by said frame and being displaceable only linearly on said frame in a second direction normal to said first direction, first drive means for moving said carriage in said second direction comprising a system of pulleys and a cord of fixed length extending about said pulleys with ends of the cord fixedly secured on said base at first and second fixed points, said pulleys including a stationary pulley means fixed on said base, first and second carriage pulleys on said carriage, and first and second pairs of frame pulleys on said frame, one pair generally adjacent each of said carriage pulleys, said cord formed as a principal loop extending from said first fixed point to said stationary pulley means and back to said second fixed point, said cord further formed into two secondary loops, each situated along the principal loop intermediate one end of the cord and said stationary pulley means, wherein said cord from said first fixed point extends to one of the pulleys of said first pair of frame pulleys, then to the first carriage pulley, then to the other of said first pair of frame pulleys, then to said stationary pulley means, then to one of the pulleys of said second pair of frame pulleys, then to the second carriage pulley, then to the remaining frame pulley, and then to the second fixed point, said drive means further comprising motor means for rotating said stationary pulley means for displacing a portion of said cord extending thereabout and between said two carriage pulleys for moving the carriage in said second direction.

* * * * *

UNITED STATES PATENT OFFICE
CERTIFICATE OF CORRECTION

Patent No. 3848134      Dated November 12, 1974

Inventor(s) KURT GIESCHEN ET AL

It is certified that error appears in the above-identified patent and that said Letters Patent are hereby corrected as shown below:

In the heading:

after "May 31, 1972 Germany" change "2226473" to

--P.226473.9--

Signed and sealed this 7th day of January 1975.

(SEAL)
Attest:

McCOY M. GIBSON JR.
Attesting Officer

C. MARSHALL DANN
Commissioner of Patents